US 6,216,193 B1

(12) United States Patent
Lai et al.

(10) Patent No.: US 6,216,193 B1
(45) Date of Patent: Apr. 10, 2001

(54) APPARATUS AND METHOD IN A NETWORK INTERFACE FOR RECOVERING FROM COMPLEX PCI BUS TERMINATION CONDITIONS

(75) Inventors: Po-Shen Lai, San Jose; Autumn Jane Niu, Sunnyvale; Jerry Chun-Jen Kuo; John M. Chiang, both of San Jose, all of CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/146,252

(22) Filed: Sep. 3, 1998

(51) Int. Cl.[7] ............................ G06F 13/00; G06F 13/38
(52) U.S. Cl. .......................... 710/129; 710/100; 711/218
(58) Field of Search .................................. 710/1, 100, 22, 710/26, 35, 129; 711/218, 219, 200; 709/212, 253; 712/208, 225; 714/15, 56, 748; 365/230.01, 230.02, 239

(56) References Cited

U.S. PATENT DOCUMENTS 5,832,005 * 11/1998 Singh .
5,933,385 * 8/1999 Jiang et al. .
5,950,233 * 9/1999 Chu et al. .

* cited by examiner

Primary Examiner—Gopal C. Ray

(57) ABSTRACT

A network interface includes a multiplexer that selectively supplies either a stored address from an address holding register, or a reload address from a reload address holding register, to a random access buffer memory based on a done delay signal (DMA_DONE_DLY). The done delay signal is generated by an advance signal generator in response to detection of a target initiated termination request on the PCI bus during a DMA data transfer from the random access buffer memory to the target. if the PCI bus transfer is interrupted, the reload address is supplied to the random access buffer memory to enable data output holding registers to be reloaded with the data lost by the target during the interrupted DMA transfer. The array of data output holding registers are capable of recovering from the interrupted PCI bus transfer and output the data set which the target (e.g., the host system memory) expects to receive. The reload address is also supplied to the address register to resume normal addressing by address holding register.

15 Claims, 7 Drawing Sheets

APPARATUS AND METHOD IN A NETWORK INTERFACE FOR RECOVERING FROM COMPLEX PCI BUS TERMINATION CONDITIONS

BACKGROUND OF THE INVENTION

1. Technical Field

The present invention relates to network interfaces, and more specifically to arrangements in network interfaces for loading data for transfer, using Direct Memory Access (DMA) techniques, via a host bus between a host memory and the network interface.

2. Background Art

Network interfaces connecting a host computer to a network such as an Ethernet-type or 802.3 network, typically utilize a host bus to transfer information between a host memory and the network interface. Two types of bus transfers may be used, namely master mode and slave mode. In master mode, a transaction or transfer of information over the bus is initiated by the network interface as a master, which arbitrates for use of the bus along with other masters requesting use of the bus. One example of a host bus is the peripheral component interconnect (PCI) local bus. A single transaction or transfer of information over a PCI bus comprises an address phase followed by one or more contiguous data phases. In conducting transactions, the PCI bus makes use of a centralized, synchronous arbitration scheme in which each PCI master must arbitrate for each transaction the master wishes to perform using a unique request and grant signal. These signal lines are attached to a central arbiter and a request-grant handshake is used to grant the master access to the bus. A common sequence for a request-grant handshake is begun when the master asserts a request signal to request use of the bus. Typically, a host CPU will respond with a grant signal which is followed the by assertion of a frame signal that together identify when the bus is available for use by the network interface.

During a PCI data burst transfer between a network interface and a host memory, signals are exchanged and data is transferred during a time when a number of other activities may be occurring internal to the network interface, the host memory, or other requesting components linked to the PCI bus. Complex bus termination conditions are events that forcibly halt PCI bus data transfer, and may be caused by different events. Two examples of complex conditions include when a host memory is not ready to receive a data transfer after the bus has been secured, or when the host memory becomes unable to continue receiving data following initiation of the data transfer. In either case, the target asserts a STOP# signal on the PCI bus to terminate the data transfer. In response to these exemplary events, network interfaces transferring data onto the PCI bus enter a RETRY or DISCONNECT state.

The events or conditions that initiate a DISCONNECT state include when the target memory (i.e., the host memory) is slow to complete the data phase, the target memory does not support the data burst mode, the target memory does not understand the addressing sequence, the current data item crosses over an address boundary of the target memory, or a data burst memory transfer crosses over a cache line boundary. The events or conditions that initiate a RETRY state include when the target memory is very slow to complete the first data phase, there is a snoop hit on a modified cache line, a resource of the target is busy, or the target memory is locked. When any of these conditions causing DISCONNECT or RETRY occur, the target may use a stop signal (STOP#) to tell the initiator to end the transaction on the current data phase. By using a device select signal (DEVSEL#) and a target ready signal (TRDY#) in conjunction with the stop signal (STOP#), the target can indicate to the initiator to disconnect, retry, or enter other complex bus termination conditions.

Assuming, in a DMA access mode, the master decides to resume the data burst transfer, the master then re-arbitrates for bus ownership. When the master successfully re-acquires PCI bus ownership, the initiator re-initiates the transaction using the double word address of the next data item that would have been transferred if the complex condition (e.g., disconnection) had not occurred. In other words, the initiator resumes the transfer where it left off.

In prior art systems data was frequently lost upon entry of recovery from these states because data transferred during the occurrence of a complex bus termination condition would be lost. Prior art systems using FIFO (first-in, firstout) buffer memory that output data in response to a data transfer request would lose the data if the transfer was not successful. Hence, complicated recovery arrangements were made in prior art systems to mitigate the loss of data or accommodate for the complex termination conditions, and typically required use of an equally complicated reset protocol. For example, higher network protocol layers would send a message across the network, requesting the transmitting station to resend a data pocket Hence, network throughput would be reduced due to resent packets.

SUMMARY OF THE INVENTION

There is a need for an arrangement that accommodates for complex host bus termination conditions during transfers of data between a network interface device and a target memory via the host bus.

There is also a need for an arrangement that enables data to be transferred reliably between a network interface device and a target memory via a host bus by reading the data from a random access memory. Specifically, there is a need for reliably transferring data from a network interface device to a target memory despite the occurrence of complex bus termination conditions, by selectively addressing a random access memory storing the data.

There is also a need for an arrangement that outputs data from a random access buffer memory in a network interface to a host memory via a host bus in response to complex bus termination conditions by resupplying data which was not successfully received by the host memory.

There is also a need for an arrangement in a network interface that selectively supplies address data to a random access buffer memory based on the determination of whether data, supplied from the random access memory to a target host memory via a local bus, has been successfully received by the target host memory.

These and other needs are attained by the present invention, where a random access memory is selectively addressed with either a read address or a reload address based on successful transfer of data. The reload address differs from the read address by up to a predetermined burst value, and is incremented based on successful transfer of data to the target If previously supplied data has not been successfully received by the target, the reload address is supplied to the random access memory so that the next data, following the last successfully received data, is re-supplied from the memory to the target.

According to one aspect of the present invention, a method in a network interface having a bus access controller is configured for transferring frame data between a target via a host bus. The method comprises storing a read address in an address register and a reload address in a reload register, where the read address and the reload address each identify a corresponding data word stored in a random access memory and the reload address differs from the read address up to a predetermined data burst value. The data word identified by the read address is output from the random access memory to a holding register array having a number of successive holding registers, one of the holding registers being an output holding register. The read address in the address register is incremented based on the output holding register outputting the data word onto the host bus. The reload address is selectively supplied to the random access memory based on unsuccessful reception of the output data word by the target The selective supplying of the reload address to the random access memory allows data to be reloaded to the holding register array if the target was unable to receive data previously transmitted Thus, data previously output from the random access memory during a PCI burst transfer having encountered complex bus conditions can be resupplied with minimal complexity.

Another aspect of the present invention provides a network interface device for transferring data to a host memory via a host bus. The network interface comprises a random access buffer memory, a read address register for storing a read address identifying a first memory location of the random access buffer memory storing a corresponding first data word, a reload register for storing a reload address identifying a second memory location of the random access buffer memory storing a corresponding second data word, the reload address differing from the read address up to a predetermined value and corresponding to a number of data words lost during a detected unsuccessful transfer of data on the host bus, and an address controller for selectively supplying one of the read address and the reload address to the random access buffer memory based on one of a detected successful transfer and the detected unsuccessful transfer of the first data word to the host memory via the host bus. The reload register maintains the address of data sent but not yet confirmed by the target as being successfully received. In the event that a complex bus termination condition interferes with the successful transfer of data, the address stored in the reload register is supplied to the memory so that the next data word that would have been transferred by the network interface device is re-sent to the target when the target is ready to receive the data.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention will be described with the example of a network interface in a network, such as an Ethernet (IEEE 802.3) network. A description will first be given of the network interface architecture and the memory management architecture, followed by the arrangement for supplying frame data between a memory buffer and a target via a host bus in response to complex bus conditions caused by a target initiated termination request according to an embodiment of the present invention.

Network Interface Architecture

Figure 1A:
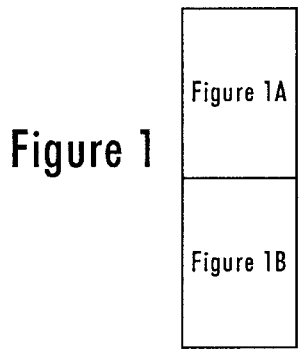
FIGS. 1A and 1B are top and bottom parts of FIG. 1 which is a block diagram illustrating an exemplary network interface device which may be use for loading data to be transferred between the network interface and a target via a host bus.
Figure 1A:
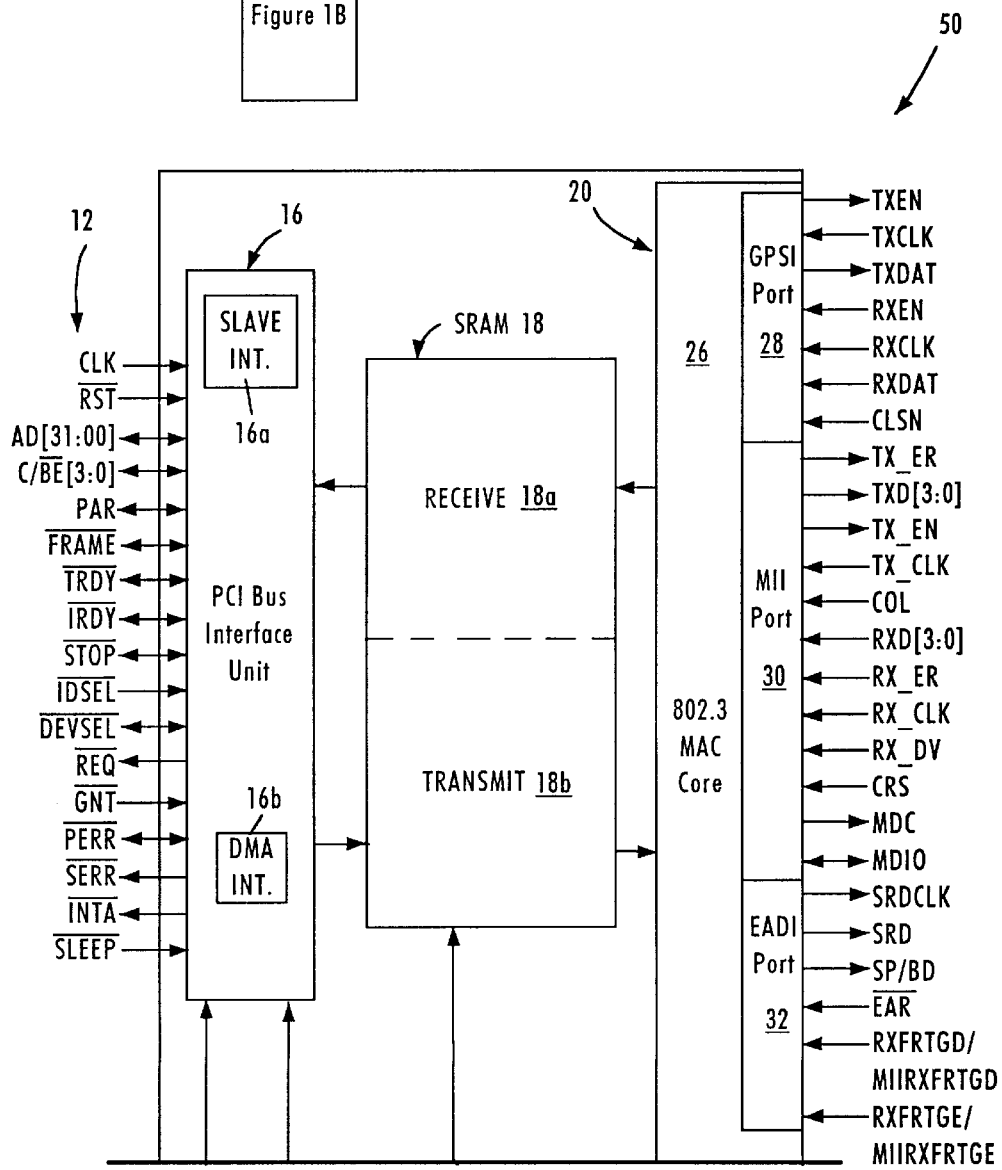
Figure 1B:
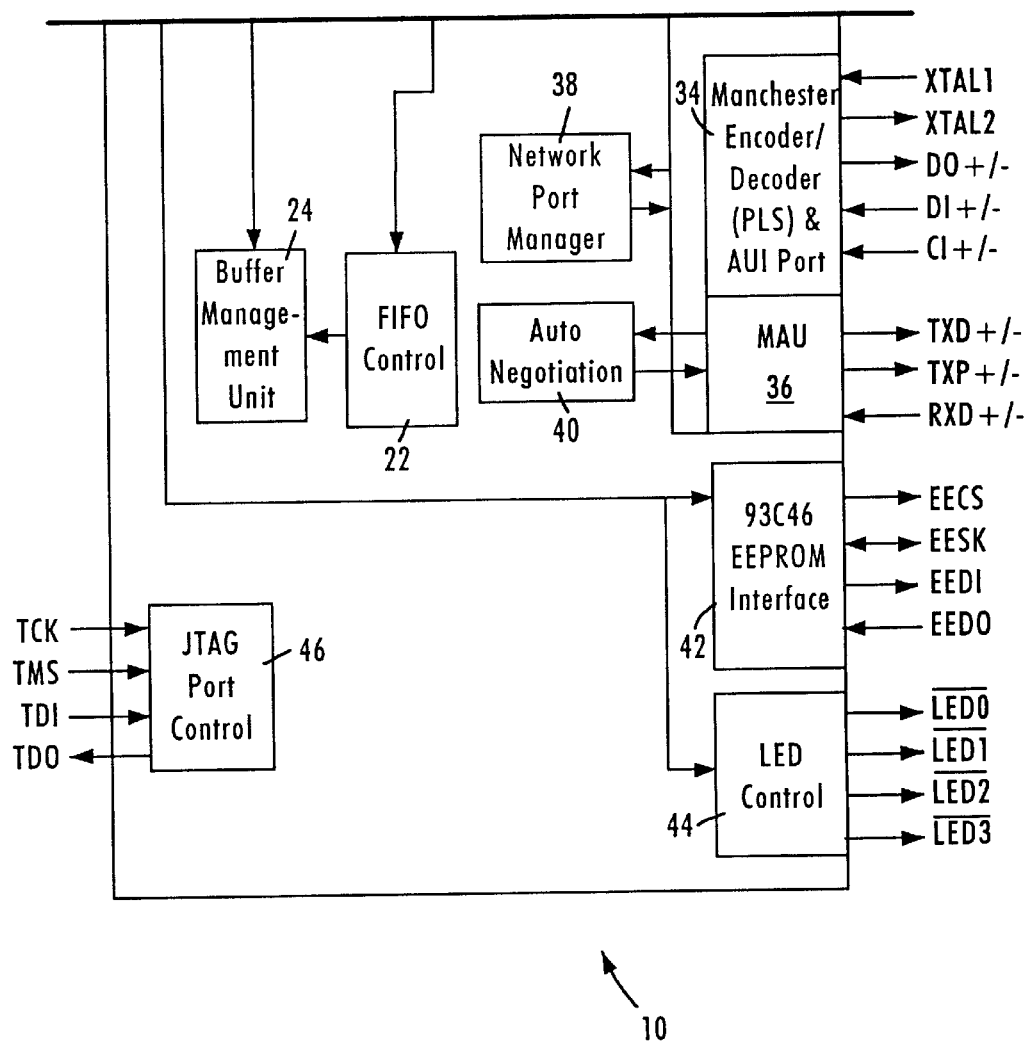

FIG. 1 is a block diagram of an exemplary network interface device 10 that accesses the media of an Ethernet (ANSI/IEEE 802.3) network according to an embodiment of the present invention.

The network interface 10, preferably a single-chip, 32-bit Ethernet controller, provides an interface between a local bus 12 of a computer, for example a peripheral component interconnect (PCI) local bus, and an Ethernet-based media 50.

The interface 10 includes a PCI bus interface unit 16, a buffer memory portion 18, and a network interface portion 20. The PCI bus interface unit 16 includes a PCI slave interface 16a and a DMA interface 16b. The slave interface 16a manages PCI control and status information including reading and programing of the PCI status registers, but may also be configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

The memory portion 18 includes a 32-bit SRAM implemented directly on the network interface chip 10. According to the disclosed embodiment, the SRAM 18 may be accessed in a random access manner under the control of a first in, first out (FIFO) control unit 22, or may be segmented into a receive portion 18a and a transmit portion 18b for receive and transmit paths, respectively.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory controller 22 are shown as discrete components, the two units may be integrated to form a memory management unit controlling all transfers of data to and from the memory unit 18.

The network interface 20 includes a media access control (MAC) core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver media attachment unit (MAU) 36.

The network interface 10 also includes a network port manager 38 configured for performing MII handshaking between two devices on an MII bus via the MII port 30. Such MII handshaking may include link information, programing information at the MII layer using a management data clock (MDC), and management data input/output (MDIO) paths.

The auto-negotiation portion 40 performs IEEE-compliant negotiation with a link part on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface status registers (not shown). The network interface 10 also includes an IEEE 1149.1-compliant JTAG boundary scan test access port interface 36.

The EEPROM interface 42 connects to an EEPROM on either a network interface adapter card or the motherboard of the host computer via a serial interface link. The EEPROM (not shown in FIG. 1) will be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down. Hence, the network interface can be configured to operate while the host computer is in a stand-by mode, enabling the network interface to output power up information to logic within the host computer to enable the host computer to automatically turn on in response to data packets received from the network and having a specific protocol, described below.

Memory Management Architecture

Figure 2:
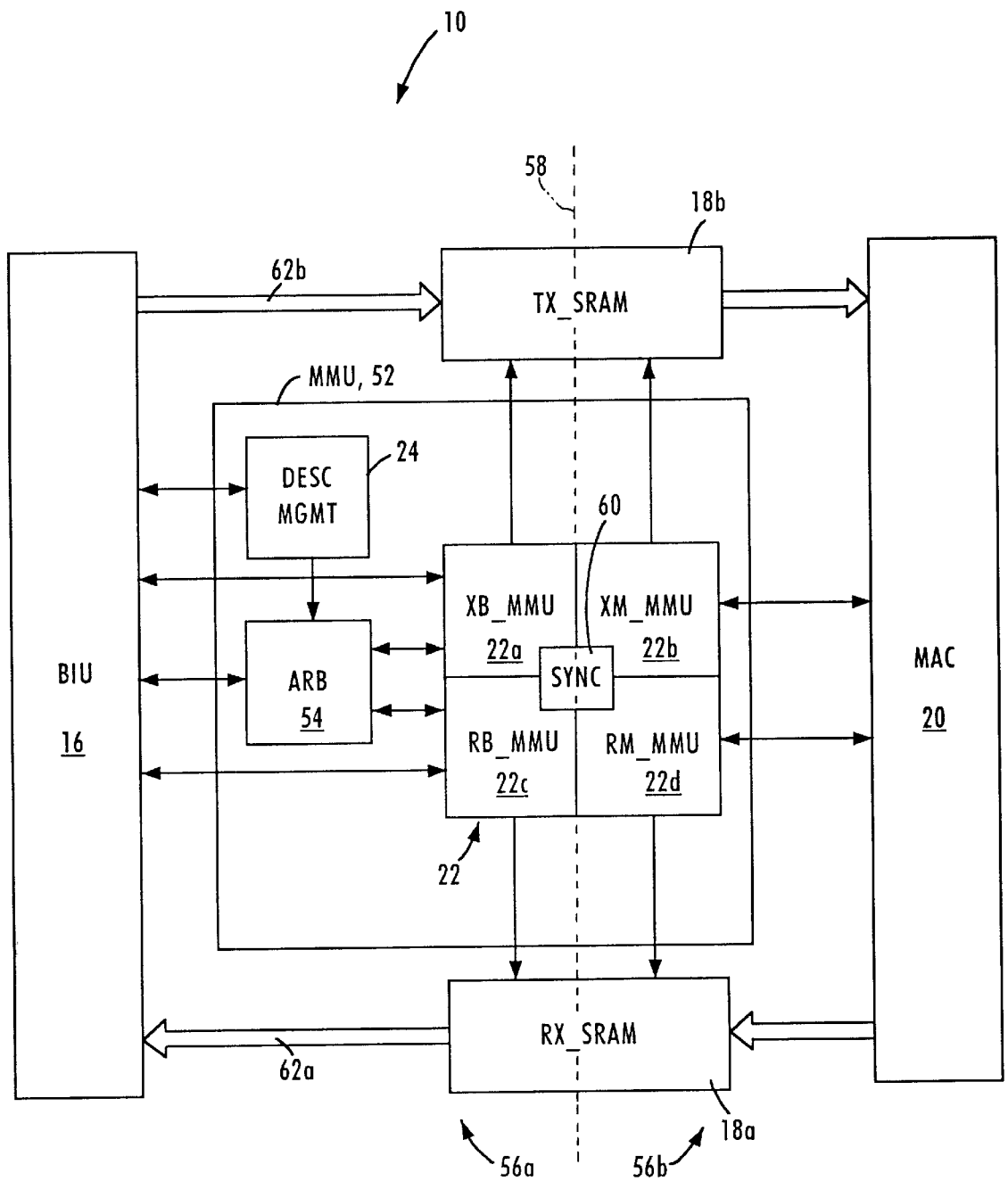
FIG. 2 is a block diagram illustrating buffer architecture of the network interface device of FIG. 1.

FIG. 2 is a block diagram illustrating the buffer architecture of the network interface 10 according to an embodiment of the present invention. As shown in FIG. 2, transfer of data frames between the BIU 16, and the MAC 20 is controlled by the memory management unit (MMU) 52 which includes a buffer management (DESC MGMT) unit 24 and a SRAM MMU 22. The MMU 52 controls the reading and writing of data to the receive SRAM portion 18a and the transmit SRAM portion 18b. It will be recognized in the art that the receive SRAM portion (RX_SRAM) 18a and the transmit SRAM portion (TX_SRAM) 18b may be implemented as a single memory device, or alternatively as two separate SRAM devices. The memory management unit 52 also includes an arbitration unit 54 which arbitrates DMA requests for data transmission, data reception, descriptor lists from the descriptor management block 24, and status.

The SRAM MMU 22 includes separate controllers for each SRAM portion 18a and 18b, for both read and write operations. According to the disclosed embodiment, the network interface 10 operates in two generic clock domains, namely a host computer bus clock domain 56a, and a network clock domain 56b. Since the network interface 10 needs to send and receive data across two independent clock domains 56, divided by the dotted line 58, the SRAM MMU 22 needs to be able to write and read data to each SRAM portion 18a and 18b in a manner that tracks memory status independent of the PCI clock in the host computer domain and the MAC clock generated from network activity in the network domain 56b.

According to the disclosed embodiment, the SRAM MMU 22 includes a transmit-data bus-side memory management unit (XB_MMU) 22a, a transmit-data MAC-side memory management unit (XM_MMU) 22b, a receive-data bus-side memory management unit RB_MMU 22c, a receive-data MAC-side memory management unit (RM_MMU) 22d, and a synchronization circuit 60. The XB_MMU 22a and the RM_MMU 22d operate as write controllers configured for writing frame data into the SRAMs 18b and 18a, respectively. The XB_MMU 22a and the RB_MMU 22c operate according to the PCI bus clock (CLK). The RM_MMU 22d operates according to the receive MAC clock (RX_CLK) received by the MAC 20, and the XM_MMU 22b operates under the control of the MAC transmit clock (TX_CLK) received by the MAC 20. The XM_MMU 22b and the RB_MMU 22c operate as read controllers configured for reading frame data from the SRAMs 18b and 18a. Hence, receive data from the MAC 20 is written into the RX_SRAM 18a under the control of the write controller 22d synchronous to the receive clock (RX_CLK) in the network clock domain 56b. Frame data stored in the RX_SRAM 18a is read and output to the BIU 16 via data path 62a under the control of the receive-data read controller 22c, which reads the frame synchronous to the PCI bus clock signal.

Similarly, transit data to be output onto the network by the MAC 20 is written into the TX_SRAM 18b via data path 62b under the control of the transit-data write controller 22a, configured for writing the frame data synchronized to the PCI bus clock (CLK). The stored transmit data is read and output from the TX_SRAM 18b to the MAC 20 under the control of the transmit-data read controller 22b according to the MAC transmit clock (TX_CLK) within the network clock domain 56b.

The presence of two separate clock domains 56a and 56b in writing and reading to a random access memory 18 requires that the write controller and read controller devices be coordinated and synchronized to ensure that no contention issues arise due to the relative independence of the two clock domains 56a and 56b. The SRAM MMU 22 includes a synchronization circuit 60 that asynchronously monitors the status of the RX_SRAM 18a and 18b, enabling the memory controllers to read and write to the memory 18 between the two clock domains 56a and 56b. Thus, problems that would ordinarily arise between the two clock domains in the individual memory management units 22a, 22b, 22c and 22d are avoided by use of the synchronization circuit 60 according to a prescribed arbitration logic.

Handing Complex PCI Conditions

As described above, an arrangement is needed for efficiently supplying data to a target even in response to complex bus conditions where the target terminates the burst transfer. According to the disclosed embodiment, the network interface fulfills these and other needs by selectively supplying a reload address to a random access memory to resupply data that was lost during interruption of a PCI burst transfer by a target initiated termination request.

Figure 3A:
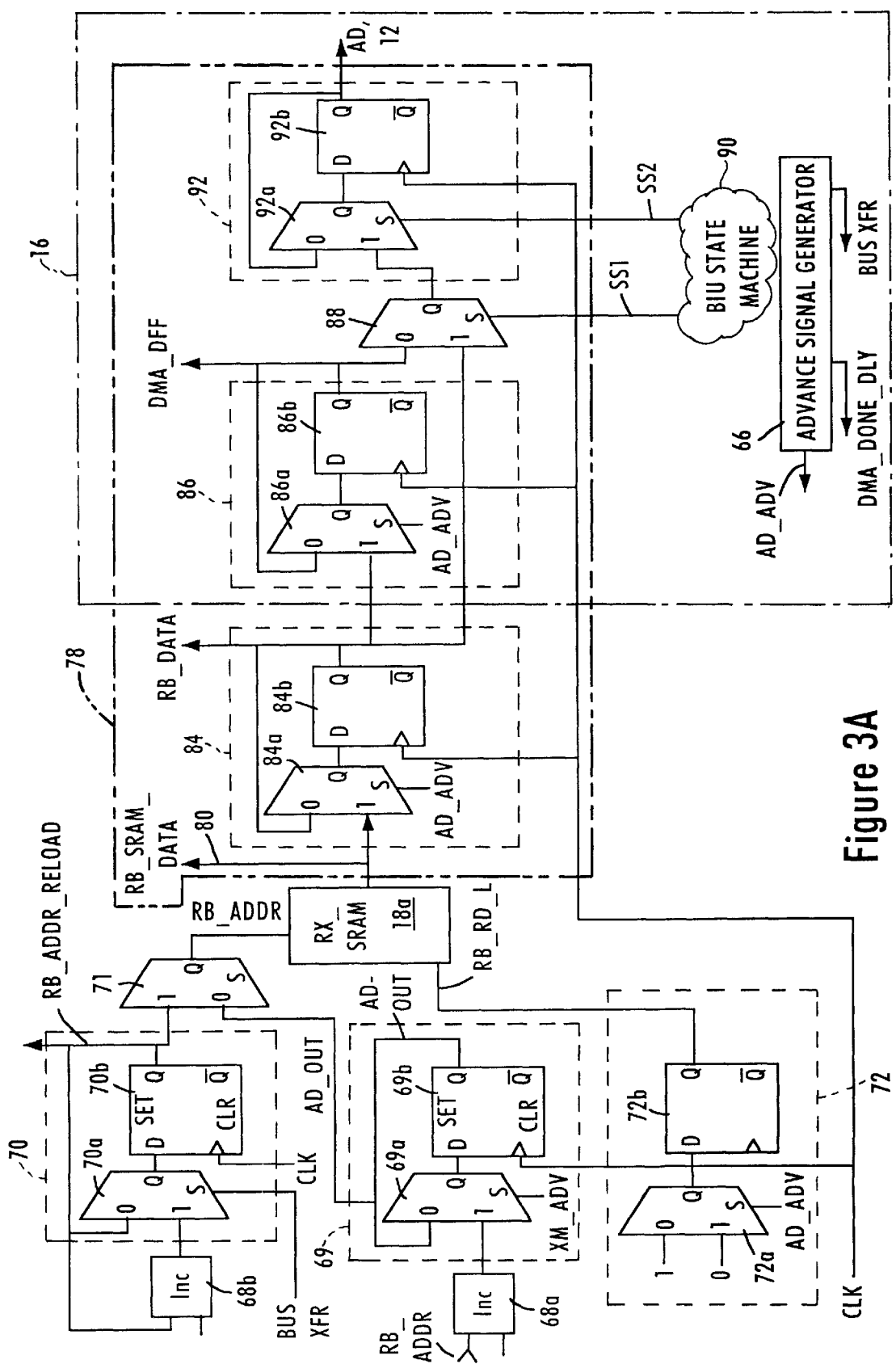
FIGS. 3A and 3B are diagrams illustrating a configuration of address holding registers and an array of data holding registers for outputting data onto the host bus of FIGS. 1 and 2 according to an embodiment of the present invention.
Figure 3B:
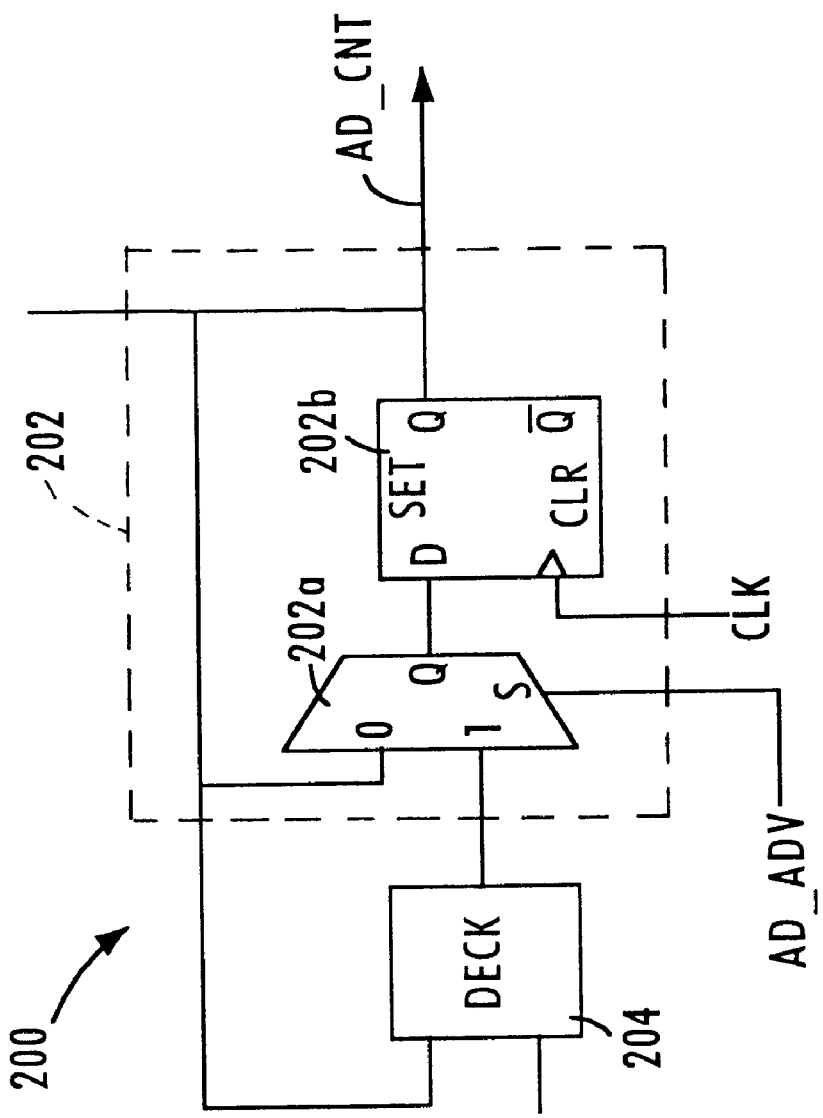

FIGS. 3A and 3B are block diagrams illustrating an exemplary configuration used to load data for output to the PCI bus 12. As shown in FIG. 3A, the RB_MMU 22c includes address incrementers 68, a read address holding register 69, a reload address holding register 70, a multiplexer 71, a read signal holding register 72, and a data holding register 84. The BIU 16 includes a holding register 86, a multiplexer 88, a state machine 9909, an output holding register 92, and an advance signal generator 66. The holding registers 84, 86 and 92 constitute an array of output holding registers 78.

During normal operation, the address holding register 69 supplies an address to the static random access memory 18a. The SRAM 18a in response outputs the addressed data word to the array of output holding registers 78. The output holding registers 78 hold the data words for output onto a PCI host bus 12. However, complex bus conditions, such as a disconnect or retry state initiated by the target, can arise after a data word is output from memory 18a into the register array 78, but before the registers successfully transfer the data words to the target memory. In order to recover the data words output to the array 78 of holding registers, the multiplexer 71 supplies the reload address stored in reload address register 70.

Reload address register 70 is incremented based on the target successfully receiving a data word, whereas the read address register is incremented based on the memory 1 a outputting a data word. Hence, any data lost during a PCI burst transfer can be recovered merely by supplying the reload address to the memory 18a and the address holding register 69, described in detail below.

As shown in FIG. 3A, BIU 16 includes an advance signal generator 66 that generates a memory advance signal (AD_ADV). The AD_ADV signal is used to update address and data holding registers with respective values, described below, based on the readiness of the target to receive the stored data. As described below, the address and data holding registers are responsive to the leading (rising) edge of the PCI bus clock (CLK). MMU 52 includes a pair of incrementers 68a and 68b that increment a read address stored in the address holding register 69 and a reload address stored in the reload address holding register 70, respectively. The addresses stored in address holding register 69 and reload address holding register 70 are respectively supplied to a pair of inputs (0 and 1) of multiplexer 71.

According to the disclosed embodiment, each of the holding registers include a multiplexer and a flip-flop responsive to the PCI bus clock. For example, address holding register 69 includes a multiplexer 69a that has a pair of inputs (0 and 1) that are selectively supplied (0 or 1) by a multiplexer output (Q) to an input (D) of a D flip-flop 69b based on the advance signal (AD_ADV), supplied to a selection input (S) of multiplexer 69a. D flip-flop 69b stores the address supplied by multiplexer 69a in response to the leading edge of PCI bus clock (CLK), and that outputs the stored address as read address signal (AD_OUT) to multiplexer 71. The supply of D flip-flop output (Q) back to multiplexer input (0) allows the same address to be stored in D flip-flop 69b for consecutive clock cycles, if necessary, based on the advance signal (AD_ADV) having a zero value.

Multiplexer 69a supplies the incremented address from incrementer 68a for storage in D flip-flop 69b in response to an advance signal (AD_ADV) having a value of one supplied by advance signal generator 66 to selection input (S). Initially, a first read address A1 is stored in D flip-flop 69b. The incrementer 68a increments the read address (RB_ADDR) supplied by multiplexer 71 in response to the advance signal AD_ADV.

Reload address holding register 70 has a structure similar to address holding register 69. Incrementer 68b supplies an incremented reload address to the reload address holding register 70. Reload address holding register 70 also initially stores a first read address A1. Reload address holding register 70 includes a multiplexer 70a for selectively supplying the incremented address from incrementer 68b to a D flip-flop 70b in response to a bus transfer signal (BUS_XFR). The bus transfer signal is generated by BIU 16, for example by the advance signal generator 66, in response to BIU 16 detecting the successful transfer of a data set from SRAM 18a to the target. The reload address holding register 70 outputs the stored address as a reload address signal (RB_ADDR_RELOAD) to the multiplexer 71, and back to incrementer 68b. As described below, the disclosed embodiment can recover from complex PCI bus termination conditions initiated by the target by supplying the reload address signal (RB_ADDR_RELOAD) from the multiplexer 71 to SRAM 18a.

Multiplexer 71 selectively outputs either the read address from the address holding register 69 (AD_OUT) or the reload address from the reload address holding register 70 (RB_ADDR_RELOAD) based on a done delay signal (DMA_DONE_DLY) generated by the advance signal generates 66 in the BIU 16. The done delay signal (DMA_DONE_DLY) is generated by the advance signal generated in response to detecting a complex bus termination condition initiated by the target that halts the transfer of data on the PCI bus. Multiplexer 71 also supplies the address (RB_ADDR) to incrementer 68a. Therefore, multiplexer 71 resets address register 69 during the recovery from complex PCI bus conditions as will be described below in conjunction with the timing diagrams of FIGS. 4 and 5. Hence, the advance signal generator 66 acts as an address controller for selectively supplying the read address (AD_OUT) or the reload address (RB_ADDR_RELOAD) by controlling the advance signal (AD_ADV), the bus transfer signal (BUS_XFR), and the done delay signal (DMA_DONE_DLY) supplied to read address register 69, reload address register 70, and multiplexer 71, respectively.

Read signal holding register 72 supplies a read line control signal (RB_RD_L) to SRAM 18a in response to the advance signal (AD_ADV=1) at the leading edge of PCI bus clock (CLK).

SRAM 18a supplies stored 32-bit data sets or words of frame data from a memory location specified by the read address signal (RB_ADDR) via a data path (RB_SRAM_DATA) to a 32-bit array 78 of holding registers in response to the read line control signal (RB_RD_L) and the read address signal (RB_ADDR). The array 78 of holding registers comprises 32-bit holding registers 84 and 86 that output respective stored 32-bit values to a 32-bit multiplexer 88, and an output holding register 92. The multiplexer 88 selectively outputs the values from at least one of the registers 84 and 86 to a 32-bit output holding register 92 for output onto PCI bus 12 based on select signals SS1 and SS2 generated by a BIU state machine 90.

The holding register 84 selectively stores and outputs data from the RB_SRAM_DATA path in response to the AD_ADV signal and the PCI clock signal. The holding register 84 outputs stored data to the holding register 86 and multiplexer 88 via the RB_DATA path.

The holding register 86 also stores supplied data in response to the AD_ADV signal and the PCI clock signal, and outputs stored data to the multiplexer 88 via the DMA__DFF signal path.

Multiplexer 88 selectively outputs either the data set supplied by register 84 or register 86 to output holding register 92 for output to the target using PCI bus 12 in response to a select signal SS1 supplied by BIU state machine 90. The select signal SS1 may include, for example, 4-bit or 32-bit selection values for selecting the data for byte alignment on the PCI bus on a per-byte or per-bit basis, respectively.

The output holding register 92 selectively stores and outputs onto the PCI bus the output of multiplexer 88 in response to select signal SS2 and the PCI clock.

BIU state machine 90 generates select signals SS1 and SS2 based on signals supplied over PCI bus 12 and detected by BIU 16. As described below, BIU 16 detects signals that include a DMA request signal, generated by MMU 52, indicating a request for use of PCI bus 12 by the network interface 10, a target ready signal (TRDY#) which indicates a readiness of the target to receive data via the PCI bus, and a stop signal (STOP#) initiated by the target to halt a data transfer.

Assuming selection on a double-word basis, BIU state machine 90 generates select signal SS1 equal to one, which enables the register 84 to supply output holding register 92 the data set stored in D flip-flop 84b. The BIU state machine 90 sets SS1 equal to one based on whether BIU 16 detects a successful transfer at the leading edge of the current clock cycle and also at the leading edge of the preceding clock cycle. If BIU 16 detects no successful transfer at the leading edge of the current clock cycle and also at the leading edge of the preceding clock cycle, then BIU state machine generates select signal SS1 equal to zero which enables holding register 86 to continue supplying register 92 with the data set stored in D flip-flop 86b. Thus, BIU state machine 90 generates select signal SS1=1 in response to BIU 16 detecting two consecutive successful transfers of data, one during the current clock cycle and one during the immediately preceding clock cycle.

In transferring data such as frame data, a unit of measure known as a write burst is specified by descriptor management 24 as the number of double words (DWORDS) to be transferred (e.g., 8). FIG. 3B illustrates a burst counter 200 used in network interface 10 for keeping track of the number of data sets of each write burst that are supplied by SRAM 18a. The burst counter 200 includes decrementer 204 and a register 202. The decrementer 204 is initialized with a burst count value (e.g., 8), and decrements the stored count value in response to the AD__ADV signal and the PCI clock signal until all data sets of the entire write burst are supplied by SRAM 18a.

Figure 4:
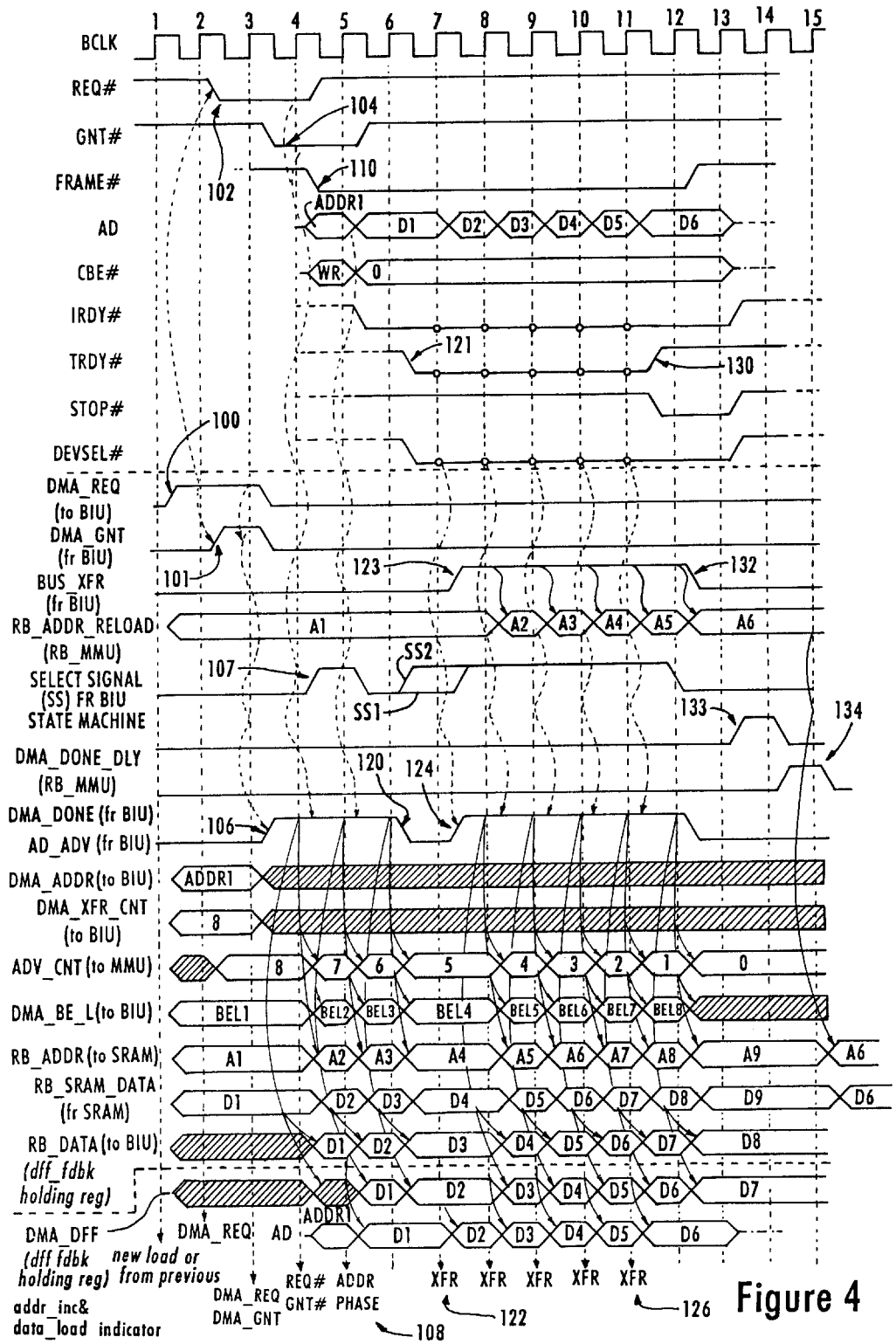
FIG. 4 is a timing diagram illustrating a relationship between signals and data generated by the network interface according to an embodiment of the present invention.
Figure 5:
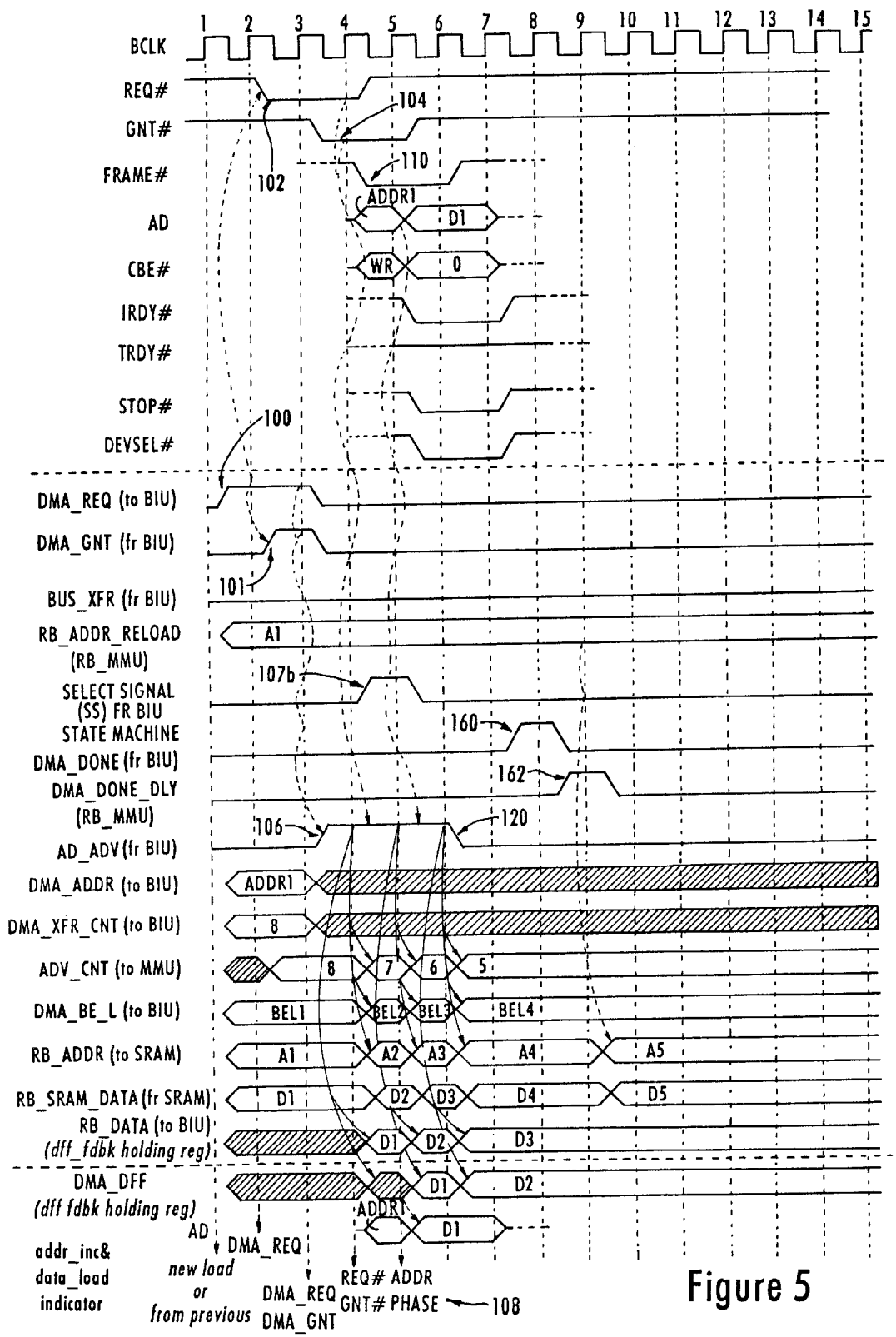
FIG. 5 is a timing diagram illustrating a relationship between signals and data generated by the network interface according to an embodiment of the present invention.

FIGS. 4 and 5 are timing diagrams illustrating examples of outputting data from the SRAM 18a to the PCI bus 12 according to an embodiment of the present invention. FIGS. 4 and 5 illustrate operations of the network interface device in response to detecting DISCONNECT and RETRY conditions on the PCI bus, respectively.

In both FIGS. 4 and 5, descriptor management unit 24 (FIG. 2) initiates a request to perform a DMA transfer on the PCI bus 12 by outputting, during clock cycle 1 at event 100, a DMA request signal (DMA__REQ), a DMA address (pointing to a target location in system memory), and a transfer count (DMA__XFR__CNT) specifying a number of transfers to be made to complete the write burst. A write burst is a predefined number (DMA__XFR__CNT) (e.g., 8) of data sets that comprise a data frame, and this number (DMA__XFR__CNT) is supplied to register 202 at the beginning of a burst and at the leading edge of clock cycle 2. Address A1 is stored in holding registers 70a and 70b upon initialization of the data burst based on address information supplied from the descriptor management block 24. SRAM 18a supplies a first 32-bit data set (D1), also referred to as a double word (DWORD), based on the supplied address A1 stored in D flip-flop 69b. The SRAM 18a outputs D1 onto data path (RB__SRAM__DATA) 80 at the leading edge of the first clock cycle.

The BIU 16 recognizes the DMA request signal (DMA__REQ) at the leading edge of clock cycle 2, and in response outputs a DMA grant signal (DMA__GNT) to the descriptor management unit 24 and the RB__MMU 22c at event 101. During clock cycle 2 at event 102, the BIU 16 asserts a request signal (REQ#) on the PCI bus in response to the DMA request signal (DMA__REQ), and waits for a PCI arbiter (e.g., the host CPU) to assert a grant signal (GNT#), in this case at event 104 beginning in the middle of clock cycle 3.

Advance signal generator 66 initiates the assertion of an advance signal (AD__ADV) from BIU 16 at event 106 in response to the concurrent assertion of the request signal (DMA__REQ) by the descriptor management unit 24 and the grant signal (DMA__GNT) by the BIU 16. The first 32-bit data set (D1) output via signal path (RB__SRAM__DATA) 80 is latched by holding register 84 in response to the advance signal (AD__ADV) asserted by advance signal generator 66 through the leading edge of clock cycle 4. The first data set (D1) is then output via the RB__DATA path by the holding register 84 in response to the leading edge of clock cycle 4.

Incrementer 68a increments the address (RD__ADDR) stored in address register 69 to A2 based on the advance signal (AD__ADV). The read address holding register 69 latches A2 in response to AD__ADV and the leading edge of clock cycle 4. The reload address register 70, however, is not incremented because the target has not yet received the fist data set D1. Therefore, in the event of an occurrence that impedes the successful transfer of the first data set D1 to the target (e.g., a disconnect or retry condition), reload address holding register 70 is able to supply (via multiplexer 71) the reload address (A1) to SRAM 18a. Hence, the reload address register 70 allows recovery from PCI bus conditions where a data transfer was not successfully completed.

As shown in FIG. 4, decrementer 204 decrements the count (ADV__CNT) stored in register 202 in response to the advance signal (AD__ADV), at the leading edge of clock cycle 4. SRAM 18a supplies a second data set (D2) during clock cycle 4 to data path (RB__SRAM__DATA) 80 in response to receiving the address signal A2 via the RB__ADDR signal path.

During clock cycle 4, BIU 16 outputs a target address signal having the value ADDR1 onto PCI bus (AD) 12 in response to the grant signal (GNT#) asserted by the PCI arbiter on host PCI bus 12. The transfer and reception of the address data (ADDR1) at event 108 is known as an address phase.

Advance signal generator 66 continues the assertion of advance signal (AD__ADV) during clock cycle 4 based on the concurrent assertion of the request signal (REQ#) and grant signal (GNT#) by the PCI arbiter. Register 84 supplies the first data set (D1) to input (1) of multiplexer 88 and to register 86 via the RB__DATA path in response to the advance signal (AD__ADV) during clock cycle 4 and through the leading edge of clock cycle 5.

BIU state machine 90 sets the select signals SS1 and SS2 to one at event 107 causing the output holding register 92 to output the first data set (D1) at clock cycle 5 following the address phase.

Holding register 84 latches the second data set (D2) in response to the advance signal (AD_ADV) during clock cycle 5. Incrementer 68a increments the address (RB_ADDR) to A3 based on the advance signal (AD_ADV), and register 69 latches address A3 during clock cycle 5. Decrementer 202a decrements the transfer count number (ADV_CNT) stored in register 202 to six based on the advance signal (AD_ADV), and D flip-flop 202b latches the transfer count number (ADV_CNT) during clock cycle 5. SRAM 18a supplies a third data set (D3) during clock cycle 5 to data path (RB_SRAM_DATA) 80 in response to receiving the address A3 and the read line control signal (RB_RD_L).

In FIGS. 4 and 5, BIU 16 asserts a frame signal (FRAME#), at event 110 during clock cycle 4, on PCI host bus 12 to indicate the BIU 16, as initiator of the transfer, is ready to begin the transfer of valid data. (Signals followed by # are active low.) In contrast, prior art systems experience much longer arbitration delays and wait states because these prior art systems wait until the frame signal (FRAME#) is asserted before retrieving the first data set (D1) from memory. As a consequence, prior art systems may require multiple wait states.

The presently described arrangement, however, stores multiple data sets onto the holding registers of array 78 based on signals generated by the advance signal generator 66 and the BIU state machine 90, independent of the assertion of the frame signal (FRAME#). Hence, the disclosed embodiment stores the first data set (D1) into output holding register 92 based on the select signals SS1 and SS2 generated by BIU state machine 90 during clock cycle 5 whose leading edge is the same time at which the frame signal (FRAME#) is initially detected, thus eliminating unnecessary arbitration delays and wait states. Furthermore, the second data set (D2) has been supplied to holding register 84 and the third data set (D3) is being supplied to data path (RB_SRAM_DATA) 80 from SRAM 18a during clock cycle 5.

At clock cycle 6, advance signal generator 66 deasserts the advance signal at event 120 during clock cycle 6 based on BIU 16 not detecting any target ready signal (TRDY#) on PCI bus 12. Registers 92, 86 and 84 hold data sets D1, D2 and D3 respectively at the leading edge of clock cycle 7 in response to the respective multiplexers 92a, 86a, and 84a, each receiving the deasserted advance signal (AD_ADV).

During clock cycle 6 in FIG. 4, the target asserts the target ready signal (TRDY#) over PCI bus 12 at event 121 indicating the target is ready to receive data. The output holding register 92 successfully transfers at event 122 the first data set (D1) to the target via PCI bus (AD) 12. At event 123, the advance signal generator 66 of BIU 16 asserts a bus transfer signal (BUS_XFR) during clock cycle 7 in response to the deasserted TRDY# signal, indicating successful data transfer. BIU state machine 90 also supplies select signal SS1 having a value of zero to multiplexer 88 during clock cycle 7, causing output of the second data set (D2) to output holding register 92.

Incrementer 68b supplies the second address A2 to the reload address register 70 in response to the bus transfer signal (BUS_XFR) asserted during clock cycle 7. The reload address register 70 latches the incremented address A2 in response to the bus transfer signal (BUS_XFR) and at the leading edge of clock cycle 8. Therefore, if any subsequent bus conditions interrupt the transfer of data sets already output from SRAM 18a, multiplexer 71 can selectively supply the reload address (RB_ADDR_RELOAD=A2) stored in reload address holding register 70 to SRAM 18a.

Advance signal generator 66 asserts the advance signal (AD_ADV) from BIU 16 at event 124 in response to the assertion of the target ready signal detected by BIU 16 at the leading edge of clock cycle 7.

Data transfers continue in the manner described above, until the last data transfer at event 126 occurring at the leading edge of clock cycle 11, which point RB_ADDR_RELOAD=A5, RB_SRAM_DATA=D8, RB_DATA=D7, DMA_DFF=D6, and AD=D6.

During clock cycle 11, the target interrupts the PCI transfer by deasserting the target ready signal (TRDY#) and asserting the stop signal (STOP#) at event 130. The BIU state machine 90 detects the target-initiated termination request and in response deasserts SS2 during clock cycle 11, causing the output holding register 92 to hold the data set (D6) on PCI bus 12.

At clock cycle 12, BIU 16 deasserts the bus transfer signal (BUS_XFR) at event 132 in response to the deassertion of the target ready signal (TRDY#) at event 130, indicating the lack of successful transfer at the leading edge of clock cycle 12. The deassertion of the target ready signal (TRDY#) before the completion of an entire write burst (eight data set transfers in this example) is referred to as a disconnect.

Upon entry of the disconnect state, the reload address register 70 stores address A6 during clock cycle 12 and address holding register stores address A9. In other words, the target has only received five data sets D1 through D5, as evidenced by the sixth data set (D6) being maintained on PCI bus (AD) 12 at the leading edge of clock cycle 12, before the target disconnected from the bus and deasserted the target ready signal (TRDY#).

A predetermined number of clock cycles after BIU 16 deasserts the bus transfer signal (BUS_XFR) at event 132, BIU 16 asserts a done signal (DMA_DONE) for one clock cycle at event 133 indicating the end of the BIU's control of the PCI bus. MMU 52 asserts a done delay signal (DMA_DONE_DLY) one clock cycle after the done signal (DMA_DONE).

In response to the DMA_DONE_DLY signal, multiplexer 71 supplies the reload address A6 stored in reload address holding register 70 to SRAM 18a and incrementer 68a via the RB_ADDR signal path. The SRAM 18a outputs the data set D6, which was the last data set output on the PCI bus before disconnect and which is sequentially after the last successfully received data set, based on the reload address supplied by multiplexer 71.

The incrementer 68a increments the supplied address A6 to A7 in response to the advance signal (AD_ADV) and outputs the incremented address to the read address holding register 69 to continue the contiguous access of data from the SRAM 18a following the reloading step.

The operation of the exemplary embodiment discussed in FIG. 4 is similar in many respects to the operation of the exemplary embodiment discussed in FIG. 5. In both FIGS. 4 and 5, the first data set (D1) and the second data set (D2) are loaded into registers 92, 86 and 84, respectively, in the same manner during clock cycles 4 through 6 and both figures share events 100 through 120.

FIG. 5 differs from FIG. 4 in that the target ready signal (TRDY#) is not asserted by the target. Therefore in FIG. 5, register 90 holds the first data set (D1) on the AD signal path of the PCI bus 12, at the leading edge of clock cycle 6.

In FIG. 5, advance signal generator 66 maintains the assertion of the advance signal (AD_ADV) from BIU 16 through the remainder of clock cycle 5 and through the leading edge of clock cycle 6 in response to the entry of the address phase at event 108 in which the target address signal (RB_ADDR) having a value of ADDR1 is transferred to PCI bus 12. Register 84 latches the second data set (D2) from the RB_SRAM_DATA path during clock cycle 5, and outputs the second data set (D2) to multiplexer 88 and register 86.

Incrementer 68a increments the address (RB_ADDR) to A4 in response to the advance signal (AD_ADV), and read address register 69 latches address A4 during clock cycle 6.

Advance signal generator 66 deasserts the advance signal at event 120 during clock cycle 6 based on BIU 16 not detecting any target ready signal (TRDY#) on PCI bus 12. Registers 92, 86 and 84 hold data sets D1, D2 and D3 respectively at the leading edge of clock cycle 7 in response to the respective multiplexers 92a, 86a, and 84a, each receiving the deasserted advance signal (AD_ADV) signal.

A predetermined number of clock cycles after BIU 16 detects no assertion of the target ready signal (TRDY#), BIU 16 asserts the done signal (DMA_DONE) for one clock cycle at event 160 during clock cycle 7 indicating the end of PCI bus control. When data set transfer is interrupted after the bus is arbitrated for and secure, but before any data is actually transferred, the arrangement of the present invention enters a retry state. Specifically, multiplexer 71 outputs the reload address A1 from the reload address holding register 70 in response to assertion of the DMA_DONE_DLY signal at event 162, causing the SRAM 18a to output (i.e., resupply) D1 to the array 78 of data holding registers.

Therefore, SRAM 18a supplies the correct data set (D1) for output to array 78 of holding registers which is the target expects to receive once ready, based on the reload address supplied by multiplexer 71.

According to the disclosed embodiment, a reload address is selectively supplied to a random access buffer memory based on detection of an unsuccessful data transfer. The done delay signal indicates that the reload address signal (RB_ADDR_RELOAD) should be supplied to SRAM 18a lead of the address signal (AD_OUT) since the data sets corresponding to addresses previously provided to SRAM 18a by address holding register 69 were not transferred to the target based on complex PCI bus conditions impeding successful transfer.

While this invention has been described in connection with what is presently considered to be most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method in a network interface having a bus access controller, for transferring frame data between a target via a host bus, the method comprising:

storing a read address in an address register and a reload address in a reload register, the read address and the reload address each identifying a corresponding data word stored in a random access memory, the reload address differing from the read address up to a predetermined data burst value;

outputting the data word identified by the read address from the random access memory to a holding register array having a number of successive holding registers, one of the holding registers being an output holding register;

incrementing the read address in the address register based on the output holding register outputting the data word onto the host bus; and selectively supplying the reload address to the random access memory based on unsuccessful reception of the output data word by the target.

2. The method as in claim 1, further comprising:

detecting a stop signal asserted on the host bus by the target; and generating a done delay signal based on the stop signal, the supplying step comprising supplying the reload address in response to the done delay signal.

3. The method as in claim 2, further comprising:

generating a transfer request signal in the network interface by the bus access controller;

detecting on the host bus at least one of a grant signal following the transfer request signal and a target ready signal indicating a ready condition by the target to receive data; and generating a memory advance signal based on at least one of the transfer request signal, the grant signal, and the target ready signal;

wherein the incrementing step comprises incrementing the read address in response to the memory advance signal.

4. The method as in claim 3, further comprising:

generating a bus transfer signal based on a detected successful reception of the data word by the target; and incrementing the reload address in response to the bus transfer signal.

5. The method as in claim 1, further comprising:

generating a bus transfer signal based on a detected successful reception of the data word by the target; and incrementing the reload address in response to the bus transfer signal.

6. The method as in claim 1, further comprising decrementing a memory count register in response to the outputting step, the memory count register storing a number of data words to be read from the random access memory for a write burst on the host bus.

7. A network interface device for transferring data to a host memory via a host bus, comprising:

a random access buffer memory;

a read address register for storing a read address identifying a first memory location of the random access buffer memory storing a corresponding first data word;

a reload register for storing a reload address identifying a second memory location of the random access buffer memory storing a corresponding second data word, the reload address differing from the read address up to a predetermined value and corresponding to a number of data words lost during a detected unsuccessful transfer of data on the host bus; and an address controller for selectively supplying one of the read address and the reload address to the random access buffer memory based on one of a detected successful transfer and the detected unsuccessful transfer of the first data word to the host memory via the host bus.

8. The network interface device of claim 7, further comprising an array of holding registers for storing a sequence of the data words output from the random access buffer memory, the address controller setting the reload address equal to the read address upon initiation of a write burst of data from the random access buffer memory to the host memory.

9. The network interface device of claim 8, wherein the address controller generates a done delay signal in response to detection of said unsuccessful transfer, the address controller causing the supplying of the reload address to the random access buffer memory in response to the done delay signal.

10. The network interface device of claim 9, wherein the address controller outputs an advance signal and a bus transfer signal based on prescribed conditions detected on the host bus, respectively, the network interface device further comprising:

a first incrementer for incrementing the read address in response to the advance signal; and a second incrementer for incrementing the reload address in response to the bus transfer signal.

11. The network interface device of claim 7, wherein the random access buffer memory is a static random access memory.

12. The network interface device of claim 7, further comprising a read signal generator for causing the random access buffer memory to output the data word synchronous with a host bus clock.

13. The network interface device of claim 7, further comprising a burst counter for counting a number of data words output from the random access buffer memory relative to a predetermined write burst count value.

14. A method in a network interface device for transferring data to a memory via a PCI bus, comprising:

loading a holding register array with a group of data from a random access memory;

starting a PCI burst of at least the group of data;

halting the PCI burst in response to detection of a target initiated termination request;

generating a reload address having a value based on a first address specifying a beginning of the group of data and a number of detected successful transfers by the target of the PCI burst; and reloading the holding register array with at least a portion of the group of data based on the reload address.

15. The method of claim 14, wherein the generating step comprises storing the first address to an address reload register incrementing the address reload register in response to each said detected successful transfer.

* * * * *